US006331597B1

(12) United States Patent
Drumright et al.

(10) Patent No.: US 6,331,597 B1
(45) Date of Patent: Dec. 18, 2001

(54) AZIDOSILANE-MODIFIED, MOISTURE-CURABLE POLYOLEFIN POLYMERS, PROCESS FOR MAKING, AND ARTICLES OBTAINED THEREFROM

(75) Inventors: Ray Eugene Drumright, Midland, MI (US); Thoi Huu Ho, Lake Jackson, TX (US); Robert Henry Terbrueggen, Pasadena, CA (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/370,309

(22) Filed: Aug. 9, 1999

(51) Int. Cl.$^7$ .................................................. C08F 8/34
(52) U.S. Cl. .................................. 525/333.5; 525/333.6; 525/333.7; 525/333.8; 525/342
(58) Field of Search .......................... 528/333.5, 333.6, 528/333.7, 333.8, 342

(56) References Cited

U.S. PATENT DOCUMENTS

| | | | |
|---|---|---|---|
| 3,456,044 | 7/1969 | Pahlke | 264/25 |
| 3,645,992 | 2/1972 | Elston | 260/80.78 |
| 3,697,551 * | 10/1972 | Thomson | 525/333.9 |
| 4,076,698 | 2/1978 | Anderson et al. | 526/348.6 |
| 4,352,849 | 10/1982 | Mueller | 428/213 |
| 4,514,545 | 4/1985 | Barnabeo | 525/330.4 |
| 4,551,504 * | 11/1985 | Barnabeo | 525/333.9 |
| 4,588,794 | 5/1986 | Oda et al. | 526/169.2 |
| 4,597,920 | 7/1986 | Golike | 264/22 |
| 4,694,025 | 9/1987 | Park | 212/88 |
| 4,798,081 | 1/1989 | Hazlitt et al. | 73/53 |
| 4,812,519 | 3/1989 | Gillette | 525/106 |
| 4,820,557 | 4/1989 | Warren | 428/34.9 |
| 4,837,084 | 6/1989 | Warren | 428/349 |
| 4,865,902 | 9/1989 | Golike et al. | 428/215 |
| 4,927,708 | 5/1990 | Herron et al. | 428/332 |
| 4,937,299 | 6/1990 | Ewen et al. | 526/119 |
| 4,950,541 | 8/1990 | Tabor et al. | 428/373 |
| 4,952,451 | 8/1990 | Mueller | 428/218 |
| 4,963,419 | 10/1990 | Lustig et al. | 428/36.7 |
| 5,008,204 | 4/1991 | Stehling | 436/85 |
| 5,026,798 | 6/1991 | Canich | 526/127 |
| 5,055,438 | 10/1991 | Canich | 502/117 |
| 5,059,481 | 10/1991 | Lustig et al. | 428/39.9 |
| 5,064,802 | 11/1991 | Stevens et al. | 502/155 |
| 5,084,534 | 1/1992 | Welborn, Jr. et al. | 526/160 |
| 5,132,380 | 7/1992 | Stevens et al. | 526/126 |
| 5,189,192 | 2/1993 | LaPointe et al. | 556/11 |
| 5,204,419 | 4/1993 | Tsutsui et al. | 526/153 |
| 5,218,071 | 6/1993 | Tsutsui et al. | 526/348 |
| 5,244,996 | 9/1993 | Kawasaki et al. | 526/347 |
| 5,246,783 | 9/1993 | Spenadel et al. | 428/461 |
| 5,272,236 | 12/1993 | Lai et al. | 526/348.5 |
| 5,278,272 | 1/1994 | Lai et al. | 526/348.5 |
| 5,321,106 | 6/1994 | LaPointe | 526/126 |
| 5,324,800 | 6/1994 | Welborn, Jr. et al. | 526/160 |
| 5,347,024 | 9/1994 | Nickias et al. | 556/11 |
| 5,350,723 | 9/1994 | Neithamer et al. | 502/104 |
| 5,374,696 | 12/1994 | Rosen et al. | 526/126 |
| 5,399,635 | 3/1995 | Neithamer et al. | 526/126 |
| 5,405,922 | 4/1995 | DeChellis et al. | 526/68 |
| 5,665,800 | 9/1997 | Lai et al. | 524/115 |
| 5,703,187 | 12/1997 | Timmers | 526/282 |
| 5,721,185 | 2/1998 | LaPointe et al. | 502/117 |
| 5,929,129 | 7/1999 | Feichtinger | 521/134 |
| 6,096,804 * | 8/2000 | Whiteley et al. | 523/219 |
| 6,127,482 * | 10/2000 | Keogh | 525/107 |

FOREIGN PATENT DOCUMENTS

| | | | |
|---|---|---|---|
| 797917 | 10/1968 | (CA) | 401/51 |
| 0 150 773 A2 | 8/1985 | (EP) | C08F/8/42 |
| 0 295 811 A1 | 12/1988 | (EP) | C08F/8/42 |
| 0 416 815 A2 | 3/1991 | (EP) . | |
| 0 514 828 A1 | 11/1992 | (EP) . | |
| 2146066 | 2/1973 | (FR) | C08F/27/00 |
| 2198955 | 4/1974 | (FR) | C08D/5/02 |
| 93/04486 | 3/1993 | (WO) . | |
| 94/00500 | 1/1994 | (WO) . | |
| 95/32095 | 11/1995 | (WO) . | |
| 99/10393 | 3/1999 | (WO) | C08F/8/34 |

OTHER PUBLICATIONS

Wild, L., et al., *Determination of Branching Distributions in Polyethylene and Ethylene Copolymers*, Journal of Polymer Science: Polymer Physics Edition, vol. 20, pp. 441–455 (1982).

Williams, T., et al., *The Construction of a Polyethylene Calibration Curve for Gel Permeation Chromatography Using Polystyrene Fractions*, Polymer Letters, vol. 6, pp. 621–624 (1968).

Butler, Thomas I., et al., *Coextrusion Basics*, Film Extrusion Manual: Pieces, Materials, Properties, TAPPI Press, pp. 31–80 (1992).

(List continued on next page.)

*Primary Examiner*—Bernard Lipman

(57) ABSTRACT

The invention includes a water-curable azidosilane grafted polymer selected from the group consisting of (i) homogeneous ethylene polymers which has a density less than or equal to about 0.900 g/cm$^3$, and (ii) interpolymers of at least one ethylene or α-olefin and at least one vinylidene aromatic compound. The water-curable silane-grafted polymer may comprise the reaction product of: at least one first polymer, the first polymer selected from the group consisting of an interpolymer, a substantially linear ethylene polymer, and a mixture thereof; the interpolymer comprising polymer units of at least one ethylene or α-olefin and at least one vinylidene aromatic compound; and at least one monofunctional azidosilane. The invention further includes a process for producing a water-curable silane-grafted polymer. A further embodiment of the process of the invention comprises shaping the water-curable silane-grafted polymer and contacting the shaped water curable silane-grafted polymer to form a moisture-cured polymer. The invention also includes the water curable silane-grafted polymers produced by either of the two processss along with any articles obtainable from that water curable silane-grafted polymer.

8 Claims, No Drawings

OTHER PUBLICATIONS

Jenkins, Wilmer A., et al., *Packaging Foods with Plastics*, pp. 19–27 and 78–83.

Dumbleton, David, *Lamination vs. Coextrusion*, Converting Magazine, pp. 112–116, Sep. 1992.

Schrenk, W.J., et al., *Coextrusion for Barrier Packaging*, The Society of Plastics Engineers RETEC, pp. 211–229, Jun. 1981.

Osborn, Kenton R., et al., Plastic Films: Technology and Packaging Applications, pp. 1–74 (1992).

D'Aniello, Concetta, et al., *Correlation Between Microstructure and Physical Properties in Styrene–Ethylene Copolymers*, Journal of Applied Polymer Science, vol. 58, pp. 1701–1706 (1995).

Longo, Pasquale, et al., *Copolymerization of Styrene and Ethylene in the Presence of Different Syndiospecific Catalysts*, Makromol. Chem., vol. 191, pp. 2387–2396 (1990).

Lu, Zejian, et al., et al., *Copolymerization of Ethylene and Styrene with SupportedTiCl$_4$/NdCl$_3$ Catalyst*, Journal of Applied Polymer Science, vol. 53, pp. 1453–1460 (1994).

Sernetz, et al., *Influence of Polymerization Conditions on the Copolymerization of Styrene with Ethylene Using Me$_2$S1(Me$_4$Cp)(N–tert–butyl)TiCl$_2$/methylaluminoxane Ziegler–Natta catalysts*, Macromol. Chem. Phys., vol. 197, pp. 1071,1083 (1996).

Zu, Guangxue, et al., *Copolymerization of Styrene and Propene with Supported Ti Catalyst Comprising Nd Compound*, Polymer Preprints, Am. Chem. Soc. Div. Polym. Chem., vol. 35, pp. 686–687 (1994).

Green, Michael W., *Injection Molding Thermoplastics*, Modern Plastics Encyclopedia, vol. 65, pp. 270 and 272 (1989).

Schut, Jan H., *First Technical Details on Some Next–Generation Polyolefins*, Plastics Technology, p. 25, Sep. 1992.

Parker, H. Randall, *Introduction to Injection Molding*, Modern Plastics Encyclopoedia, vol. 65, pp. 264–268 (1989).

Irwin, Christopher, *Extrusion–blow molding*, Modern Plastics Encyclopedia, vol. 65, pp. 217–218 (1989).

Van der Sanden, Dirk G.F., et al., *A new family of linear ethylene polymers provides enhanced sealing performance*, Tappi Journal, pp. 99–103, Feb. 1992.

Kirk–Othmer, The Encyclopedia of Chemical Technology, Third Edition, John Wiley & Sons, New York, 1981, vol. 16, pp. 416 and 417.

Kirk–Othmer, The Encyclopedia of Chemical Technology, Third Edition, John Wiley & Sons, New York, 1981, vol. 18, pp. 191 and 192.

\* cited by examiner

AZIDOSILANE-MODIFIED, MOISTURE-CURABLE POLYOLEFIN POLYMERS, PROCESS FOR MAKING, AND ARTICLES OBTAINED THEREFROM

FIELD OF INVENTION

This invention relates to silane-grafted polyolefin polymers, more specifically to silane-grafted homogeneous ethylene polymers (HEP). These silane-grafted polymers also include those made from at least one ethylene or α-olefin and at least one vinylidene aromatic compound. This invention also relates to a process of making the moisture-curable azidosilane-grafted polymers, compositions made from the polymers, and articles made from the compositions. The invention also relates to processes for making the articles, particularly melt processing.

BACKGROUND

Silane-grafted polymers are frequently used in applications requiring good temperature resistance. Prior to being exposed to moisture, silane-grafted polymers are melt-processable. However, following exposure to moisture (usually in the presence of a tin catalyst), a fully crosslinked article with excellent temperature resistance can be obtained. Silane-grafting can also be used to improve adhesion/compatibility between polyolefins and polar substrates like glass, aluminum or polyesters.

The term "grafting" as used herein, refers to insertion of one of the nitrogens from the azide group on the azidosilane molecule into a carbon-hydrogen bond on the polymer chain. A "grafting agent" is an azidosilane that is capable of reacting with a polymer chain to insert such a nitrogen into a carbon-hydrogen bond on the polymer chain.

Silane modification of a polyolefin is usually achieved via peroxide grafting of vinyltrimethoxysilanc (VTMOS) onto the polyolefin backbone. Unfortunately, this approach has limited success with polymers which degrade in the presence of free radicals (e.g., polypropylene, polystyrene, ethylene/styrene interpolymers (ESI)). Furthermore, even for polymers like polyethylene which are successfully grafted with VTMOS, grafting is usually limited to less than 2% VTMOS because of premature gelling of the polyethylene in the presence of the intermediate radical species. This premature gelling is due to the polymer chains forming radicals that can crosslink with other polymer chains as well as graft with the VTMOS.

An interpolymer is a polymer produced from at least two different monomers. As such, interpolymers include, inter alia, copolymers (two monomers) and terpolymers (three monomers).

As used here, the term "crosslinking" refers to forming a bridge between two or more polymer chains, and/or two or more positions on a single polymer chain. The bridge is formed by primary bonds between an atom or molecule (the "crosslinking agent") and atoms attached to the polymer chain. Crosslinking thus differs from grafting in that crosslinking requires that the crosslinking agent have multiple sites that can react with the polymer chains while the grafting agent can have only one such site.

Molecular weight distribution (MWD), or polydispersity, is a well known variable in polymers. The molecular weight distribution, sometimes described as the ratio of weight average molecular weight ($M_w$) to number average molecular weight ($M_n$) (i.e. $M_w/M_n$) can be measured directly, e.g., by gel permeation chromatography techniques, or more routinely, by measuring $I_{10}/I_2$ ratio, as described in ASTM D-1238. For linear polyolefins, especially linear polyethylene, it is well known that as $M_w/M_n$ increases, $I_{10}/I_2$ also increases.

Traditional heterogeneous linear low density polyethylene polymers (LLDPE) or linear high density polyethylene polymers typically are made using Ziegler Natta polymerization processes (e.g., U.S. Pat. No. 4,076,698 (Anderson et al.), the disclosure of which is incorporated herein by reference), sometimes called heterogeneous polymers. For convenience, low density polyethylene will be abbreviated LDPE and high density polyethylene will be abbreviated HDPE. The Ziegler Natta polymerization process, by its catalytic nature, makes polymers which are heterogeneous, i.e., the polymer has several different types of branching within the same polymer composition as a result of numerous metal atom catalytic sites. In addition, the heterogeneous polymers produced in the Ziegler Natta process also have broad molecular weight distributions ($M_w/M_n$); as the $M_w/M_n$ increases, the $I_{10}/I_2$ ratio concurrently increases.

The term "homogeneous polymers" refers to polymers made using uniform branching distribution polymerization processes. Such uniformly branched or homogeneous polymers include those linear homogeneous polymers made as described in U.S. Pat. No. 3,645,992 (Elston), the disclosure of which is incorporated herein by reference, and those linear homogeneous polymers made using so-called single site catalysts in a batch reactor having relatively high olefin concentrations (as described in U.S. Pat. No. 5,026,798 (Canich) or in U.S. Pat. No. 5,055,438 (Canich), the disclosures of which are incorporated herein by reference) or those made using constrained geometry catalysts in a batch reactor also having relatively high olefin concentrations (as described in U.S. Pat. No. 5,064,802 (Stevens et al.), the disclosure of which is incorporated herein by reference, or in EPA 0 416 815 A2 (Stevens et al.)). The uniformly branched/homogeneous polymers are those polymers in which the comonomer is randomly distributed within a given interpolymer molecule and wherein substantially all of the interpolymer molecules have the same ethylene/comonomer ratio within that interpolymer, but the linear version of these polymers have an absence of long chain branching, as, for example, Exxon Chemical has taught in their February 1992 Tappi Journal paper.

The SCBDI (Short Chain Branch Distribution Index) or CDBI (Composition Distribution Branch Index) is defined as the weight percent of the polymer molecules having a comonomer content within 50 percent of the median total molar comonomer content. The CDBI of a polymer is readily calculated from data obtained from techniques known in the art, such as, for example, temperature rising elution fractionation (abbreviated herein as "TREF") as described, for example, in Wild et al *Journal of Polymer Science, Poly. Phys Ed.*, Vol. 20, p. 441 (1982), or as described in U.S. Pat. No. 4,798,081, U.S. Pat. No. 5,008,204, U.S. Pat. No. 5,246,783, WO 93/04486, the disclosures of each of which is incorporated herein by reference. The SCBDI or CDBI for the homogeneously branched linear or homogeneously branched substantially linear olefin polymers of the present invention is greater than about 50 percent, preferably greater than about 60 percent, and especially greater than about 80 percent.

Homogeneous polymers have a homogeneous branching distribution and typically only a single melting peak (determined using differential scanning calorimetry (DSC) using a second heat and a scan rate of 10C/minute from −40° C. to 160° C.), as opposed to traditional Ziegler Natta polymerized heterogeneous linear ethylene/α-olefin copolymers which have two or more melting peaks (determined using differential scanning calorimetry (DSC)).

The term "substantially linear" means that the polymer has long chain branching and that the polymer backbone is substituted with 0.01 long chain branches/1000 total carbons to 3 long chain branches/1000 total carbons, more preferably from 0.01 long chain branches/1000 total carbons to 1 long chain branches/1000 total carbons, and especially from 0.05 long chain branches/ 1000 total carbons to 1 long chain branches/1000 total carbons. The substantially linear ethylene polymers and interpolymers are described in U.S. Pat. No. 5,272,236 and U.S. Pat. No. 5,278,272, the disclosures of which are incorporated herein by reference.

As used herein, the term "ethylene polymer" means a homopolymer made from a single ethylene or α-olefin monomer.

Long chain branching for the substantially linear ethylene polymers is defined herein as a chain length of at least 6 carbons, above which the length cannot be distinguished using $^{13}C$ nuclear magnetic resonance spectroscopy. The long chain branch of the substantially linear ethylene polymers is, of course, at least one carbon longer than two carbons less than the total length of the comonomer copolymerized with ethylene. For example, in an ethylene/1-octene substantially linear polymer, the long chain branch will be at least seven carbons in length; however as a practical matter, the long chain branch has to be longer than the side chain resulting from incorporation of comonomer. For substantially linear ethylene/alpha-olefin copolymers, the long chain branch is also itself homogeneously branched, as is the backbone to which the branch is attached.

SUMMARY OF THE INVENTION

It has been discovered that azidosilane reagents are much more effective on a molar basis for modifying homogeneous ethylene polymers, or interpolymers of at least one ethylene or α-olefin and at least one vinylidene aromatic compound interpolymers than peroxide grafting with VTMOS. This difference is especially acute in the high-styrene content ESI polymers.

The term "low density" refers to polymers with a density no more than 0.900 g/cm$^3$.

The invention includes an azidosilane grafted polymer of formula (I):

$$M_a(NH\text{-}G\text{-}R\text{-}SiZ_3)_b, \quad (I)$$

where:
(A) M is a polymer repeating unit in a polymer selected from the group consisting of
  (i) homogeneous ethylene or polymers which have a density of less than or equal to almost 0.900 g/Cm$^3$, and
  (ii) interpolymers of at least one ethylene or α-olefin and at least one vinylidene aromatic compound;
(B) a is the number of polymer units in the polymer chain;
(C) G is selected from the group consisting of a sulfonyl group and a carbonyl group;
(D) R is selected from the group consisting of hydrocarbon or inertly-substituted hydrocarbon radicals, halo-substituted hydrocarbon radicals, hydrocarbon-oxyhydrocarbon radicals, hydrocarbon-thiocarbon radicals, and hydrosulfonyl-hydrocarbon radicals;
(E) Z is, independently each occurrence, a hydrogen, an organic radical, a hydrolyzable group, (including, inter alia, alkoxy groups) or a halogen; and,
(F) b is the number of silane molecules grafted onto the polymer chain, and 0<b<a.

A "hydrocarbon" is an organic compound consisting exclusively of the elements carbon and hydrogen, and includes as principal types: aliphatic (paraffins, olefins, alkenes, alkadienes, acetylenes, and acyclic terpenes) and cyclic (alicyclic. aromatic, and cyclic terpenes).

The invention includes a water-curable, silane-grafted polymer comprising the reaction product of:
(A) at least one first polymer, the first polymer selected from the group consisting of. (i) an interpolymer, the interpolymer comprising polymer units of at least one ethylene or o-olefin and at least one vinylidene aromatic compound, and
  (ii) a homogeneous ethylene polymer (HEP), and
  (iii) a mixture thereof; and
(B) at least one monofunctional azidosilane.

A "polymer unit" is the portion of a polymer formed from a single monomer or comonomer molecule.

The invention further includes a process for producing a water-curable silane-grafted polymer comprising:
(A) admixing (i) at least one first polymer, the first polymer selected from the group consisting of an interpolymer, a substantially linear ethylene polymer (SLEP), and a mixture thereof; the interpolymer comprising polymer units of at least one ethylene or α-olefin and at least one vinylidene aromatic compound, and (ii) at least one monofunctional azidosilane, the azidosilane having a decomposition temperature; and
(B) heating the polymer/azidosilane mixture of (A) to at least the decomposition temperature of the azidosilane to form the water-curable silane-grafted polymer. By decomposition temperature of the azide it is meant that temperature at which the azide converts to the carbonyl or sulfonyl nitrene, eliminating nitrogen and heat in the process, as determined by differential scanning calorimetry (DSC).

Further embodiments of the process of the invention comprises shaping the water-curable silane-grafted polymer and contacting the shaped water curable silane-grafted polymer to form a moisture-cured polymer.

The invention also includes the water curable silane-grafted polymers produced by either of the two processes along with any articles obtainable from that water curable silane-grafted polymer.

The invention also includes the use of a composition of the invention in any of these processes.

DETAILED DESCRIPTION OF THE INVENTION

Homogeneous Polyethylene Polymers

Practice of the invention is applicable to any thermoplastic polymer polymerized typically using a single site catalyst, which polymer has at least one C—H bond that can react with an azide, including homopolymers and interpolymers with narrow and broad (including bimodal) comonomer distribution such as copolymers of ethylene with one or more α-olefin ($C_3$ to $C_{20}$), ethylene copolymers with unsaturation (EPDM or EODM, that is ethylene-propylene-diene or ethylene-octene-diene), or other polymers such as linear high density polyethylene, substantially random interpolymers of at least one α-olefin with at least one vinylidene aromatic or hindered vinylidene aliphatic comonomer including ethylene-styrene interpolymers, syndiotactic polystyrene, atactic polystyrene, and combinations thereof. The polymers are advantageously prepared using single site catalysts and thus, advantageously have a narrow molecular weight distribution (MWD=Mw/Mn), that is a lower MWD than a polymer of the same composition and average molecular weight made using a Ziegler-Natta catalyst, preferably less than or equal to about 3.

The term "α-olefin" is used to refer to any of a class of unsaturated open-chained hydrocarbons, having the general formula $C_nR^1_{2n}$, where $R^1$ is a hydrogen, alkyl, other inert substituent or mixture thereof, wherein the alkyl or inert substituent does not contain an aromatic moiety, and n is the number of carbon atoms in the chain, and wherein the double bond is located between the first and second carbon atoms from an end of the chain. Unless otherwise indicated in this specification, n is any integer greater than 2. Inert substituents are atoms or groups that are not reactive with each other, other polymer or monomer molecules, or reagents under conditions used for polymerization.

The term "vinylidene aromatic" or "vinylaromatic" refers to a phenyl radical or substituted phenyl radical bonded to a vinyl group or substituted vinyl group.

Preferred polymers for use in the practice of the invention are polymers prepared from ethylene, advantageously ethylene in combination with other monomers polymerizable therewith. Such monomers include α-olefins and other monomers having at least one double bond. The polymer is a polyolefin, optionally a homopolymer, copolymer, or other interpolymer. Preferably the homo- or copolymers contain ethylene polymer units. In polyethylene copolymers, the comonomer content is preferably greater than about I weight percent as determined by $^{13}C$ NMR (carbon 13 nuclear magnetic resonance) and more preferably greater than about 3 weight percent of any monomer copolymerizable with ethylene, preferably an α-olefin or cyclic olefin, more preferably such an olefin of less than about 20 carbon atoms, most preferably from about 2 to about 18 carbon atoms. The comonomer content is at least one comonomer polymerizable with ethylene, preferably less than about 4 comonomers polymerizable with ethylene, more preferably less than 2 such comonomers.

The ethylene polymers are optionally any interpolymers of ethylene and at least one α-olefin. Preferred α-olefins are represented by formula (II):

$$CH_2=CHR^2 \qquad (II)$$

in which $R^2$ is a hydrocarbyl radical. $R^2$ generally has from one to twenty carbon atoms. Suitable α-olefins for use as comonomers include 1-propylene, 1-butene, 1-isobutylene, 1-pentene, 1-hexene, 4-methyl-1-pentene, 1-heptene and 1-octene. Preferably, the α-olefin will be 1-butene, 1-pentene, 4-methyl-1-pentene, 1-hexene, 1-heptene, 1-octene, or mixtures thereof. More preferably, the α-olefin will be 1-hexene, 1-heptene, 1-octene, or mixtures thereof. Most preferably, the α-olefin is 1-octene. The ethylene polymer silane-grafted according to this invention is more preferably a SLEP (defined hereinafter). These interpolymers preferably contain at least about 2 weight percent, more preferably at least about 5 weight percent, α-olefin.

Interpolymers useful in the practice of the invention optionally and in one preferred embodiment include a third monomer having at least two double bonds, preferably dienes or trienes. Suitable diene and triene comonomers include 7-methyl-1,6-octadiene, 3,7-dimethyl- 1,6- octadiene, 5,7-dimethyl- 1,6-octadiene, 3,7,11-trimethyl-1, 6,10-octatriene, 6-methyl-1,5-heptadiene, 1,3-butadiene, 1,6-heptadiene, 1,7-octadiene, 1,8-nonadiene, 1,9-decadiene, 1,10-undecadiene, bicyclo[2.2.1]hepta-2-5-diene (norbornadiene), tetracyclododecene, or mixtures thereof, preferably butadiene, hexadienes, and octadienes, most preferably 1,4-hexadiene, 4-methyl-1,4-hexadiene, 5-methyl-1,4-hexadiene, dicyclopentadiene, bicyclo[2.2.1]hepta-2-5-diene (norbornadiene) and 5-ethylidene-2-norbornene (ENB).

Other interpolymers of this invention may include other monomers, such as vinyl benzocyclobutane and cycloalkadienes (e.g., cyclopentadiene, cyclohexadiene, cyclooctadiene, and 5-ethylidene-2-norbornene (ENB)).

Polyolefins are formed by means within the skill in the art. The α-olefin monomers and optionally other addition polymerizable monomers are polymerized by known processes. Such processes include those processes as exemplified by U.S. Pat. No. 4,937,299 (Ewen et al.), U.S. Pat. No. 5,218, 071 (Tsutsui et al.), U.S. Pat. No. 5,278,272, 5,324,800, 5,084,534, 5,405,922, 4,588,794, 5,204,419 and the processes subsequently discussed in more detail. All patents in this paragraph are hereby incorporated by reference.

The density of the HEP as measured in accordance with ASTM D-792 is generally less than or equal to about 0.900 g/cc, preferably less than or equal to about 0.89 g/cc, and more preferably about 0.87 g/cc.

The melt index, according to ASTM D-1238, Condition 190 C/2.16 kg (also known as $I_2$). of the substantially linear olefin polymer is generally from about 0.01 g/10 min. up to about 1000 g/10 min., preferably to about 100 g/10 min., and especially to about 10 g/10 min.

The molecular weight distributions of the polymers are determined by gel permeation chromatography (GPC) on a Waters 150C high temperature chromatographic unit equipped with a differential refractometer and three columns of mixed porosity. The columns are supplied by Polymer Laboratories and are commonly packed with pore sizes of $10^3$, $10^4$, $10^5$ and $10^6 Å$. The solvent is 1,2,4-trichlorobenzene, from which about 0.3 percent by weight solutions of the samples are prepared for injection. The flow rate is about 1.0 milliliters/minute, unit operating temperature is about 140° C. and the injection size is about 100 microliters.

The molecular weight determination with respect to the polymer backbone is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in *Journal of Polymer Science*, Polymer Letters, Vol. 6, p. 621, 1968) to derive the following equation:

$$M_{polyethylene} = a * (M_{polystyrene})^b.$$

In this equation, a=0.4316 and b=1.0. Weight average molecular weight, $M_w$, is calculated in the usual manner according to the following formula: $M_j=(\Sigma w_i(M_i^j))^j$; where $w_i$ is the weight fraction of the molecules with molecular weight $M_i$ eluting from the GPC column in fraction i and j=1 when calculating $M_w$, and j=−1 when calculating $M_n$. The homogeneous ethylene polymer has $M_w/M_n$ less than or equal to 3.3, preferably less than or equal to 3, and especially in the range of from about 1.5 to about 2.5.

Homogeneous Substantially Linear Polyethylene Polymers

In one embodiment starting material polyolefins are preferably substantially linear ethylene polymers (SLFPs). The substantially linear ethylene polymers (SLEPs) are homogeneous polymers having long chain branching. They are disclosed in U.S. Pat. Nos. 5,272,236; 5,278,272; and 5,665,800, the disclosures of which are incorporated herein by reference. SLEPs are available as polymers made by the INSITE™ Process and Catalyst Technology such as ENGAGE™ polyolefin elastomers (POEs) commercially available from DuPont Dow Elastomers LLC and AFFINITY™ polyolefin plastomers (POPs) commercially available from The Dow Chemical Company. Specific examples of useful ENGAGE™ POEs include SM 8400, EG 8100, and CL 8001 and specific examples of useful AFFINITY™ POPs include FM-1570, HM 1100, and SM 1300, each of which is commercially available from The Dow Chemical Company. SLEPs can be prepared via the solution, slurry, or gas phase, preferably solution phase, polymerization of ethylene and one or more optional α-olefin comonomers in the presence of a constrained geometry catalyst, such as the catalyst disclosed in U.S. Pat. No. 5,703.187, incorporated herein by reference.

SLEPs are characterized as having:

(a) a melt flow ratio, $I_{10}/I_2 \geq 5.63$, (b) a molecular weight distribution, $M_w/M_n$ as determined by gel permeation chromatography and defined by the equation:

$$(M_w/M_n) \leq (I_{10}/I_2) - 4.63,$$

(c) a critical shear stress at the onset of gross melt fracture, as determined by gas extrusion rheometry, of greater than $4 \times 10^6$ dynes/cm$^2$ or a gas extrusion rheology such that the critical shear rate at onset of surface melt fracture for the SLEP is at least 50 percent greater than the critical shear rate at the onset of surface melt fracture for a linear ethylene polymer, the linear ethylene polymer has an $I_2$, $M_w/M_n$ and preferably density which are each within ten percent of the SLEP and wherein the respective critical shear rates of the SLEP and the linear ethylene polymer are measured at the same melt temperature using a gas extrusion rheometer, and preferably (d) a single differential scanning calorimetry, DSC, melting peak between 30 and 150 C.

α-Olefin/Vinyl Aromatic Interpolymers

Additional interpolymers suitable for the present invention optionally, and in another preferred embodiment, include substantially random interpolymers prepared by polymerizing one or more ethylene or α-olefin monomers with one or more vinyl aromatic monomers and/or one or more hindered aliphatic or cycloaliphatic vinyl monomers, and optionally with other polymerizable ethylenically unsaturated monomer(s).

Suitable ethylene or o-olefin monomers include, for example, those U.-olefin monomers containing from 3 to 20, preferably from 3 to 12, more preferably from 3 to 8 carbon atoms. Preferred such monomers include ethylene, propylene, butene- 1,4-methyl-1-pentene, hexene-1 and octene-1. Most preferred are ethylene or a combination of ethylene with $C_{3-8}$ α-olefins.

Other optional polymerizable ethylenically unsaturated monomer(s) include strained ring olefins such as norbornene and $C_{1-10}$ alkyl or $C_{6-10}$ aryl substituted norbornenes, with an exemplary interpolymer being ethylene/styrene/norbornene.

Suitable vinyl aromatic monomers which can be employed to prepare the interpolymers employed in the invention include, for example, those represented by the following formula (III):

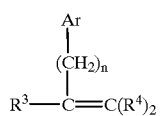

(III)

wherein $R^3$ is selected from the group of radicals consisting of hydrogen and alkyl radicals containing from 1 to 4 carbon atoms, preferably hydrogen or methyl; each $R^4$ is independently selected from the group of radicals consisting of hydrogen and alkyl radicals containing from 1 to 4 carbon atoms, preferably hydrogen or methyl; Ar is a phenyl group or an inertly-substituted phenyl group, e.g., a phenyl group substituted with from 1 to 5 substituents that are not reactive with each other, other polymer or monomers or reagents under polymerization conditions and include such groups as halo, $C_{1-4}$-alkyl, and $C_{1-4}$-haloalkyl; and n has a value from zero to 6, preferably from zero to 2, most preferably zero. Exemplary vinyl aromatic monomers include styrene, vinyl toluene, α-methylstyrene, t-butyl styrene, chlorostyrene, including all isomers of these compounds, and the like. Particularly suitable such monomers include styrene and lower alkyl- or halogen-substituted derivatives thereof. Preferred monomers include styrene, α-methyl styrene, the lower alkyl- ($C_1$-$C_4$) or phenyl-ring substituted derivatives of styrene, such as for example, ortho-, meta-, and para-methylstyrene, the ring halogenated styrenes, para-vinyl toluene or mixtures thereof, and the like. A more preferred aromatic vinyl monomer is styrene.

By the term "hindered aliphatic or cycloaliphatic vinyl or vinylidene compounds", it is meant addition polymerizable vinyl or vinylidene monomers corresponding to the formula (IV):

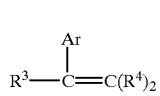

(IV)

wherein $A^1$ is a sterically bulky, aliphatic or cycloaliphatic substituent of from 3 up to 20 carbons, $R^3$ is selected from the group of radicals consisting of hydrogen and alkyl radicals containing from 1 to 4 carbon atoms, preferably hydrogen or methyl; each $R^4$ is independently selected from the group of radicals consisting of hydrogen and alkyl radicals containing from 1 to 4 carbon atoms, preferably hydrogen or methyl; or alternatively $R^3$ and $A^1$ together form a ring system. By the term "sterically bulky" is meant that the monomer bearing this substituent is normally incapable of addition polymerization by standard Ziegler-Natta polymerization catalysts at a rate comparable with ethylene polymerization. Preferred aliphatic or cycloaliphatic vinyl or vinylidene monomers are those in which one of the carbon atoms bearing ethylenic unsaturation is tertiary or quaternary substituted. Examples of such substituents include cyclic aliphatic groups such as cyclohexyl, cyclohexenyl, cyclooctenyl, or ring alkyl or aryl substituted derivatives thereof, tert-butyl, norbornyl, and the like. Most preferred hindered aliphatic or cycloaliphatic vinyl or vinylidene compounds are the various isomeric vinyl- ring substituted derivatives of cyclohexene and substituted cyclohexenes, and 5-ethylidene-2-norbornene. Especially suitable are 1-, 3-, and 4-vinylcyclohexene.

The interpolymers of one or more ethylene or α-olefins and one or more vinyl aromatic monomers and/or one or more hindered aliphatic or cycloaliphatic vinyl monomers employed in the present invention are substantially random polymers. These interpolymers usually contain from 0.5 to 65, preferably from 1 to 55, more preferably from 2 to 50 mole percent of at least one vinyl aromatic monomer and/or hindered aliphatic or cycloaliphatic vinyl monomer and from 35 to 99.5, preferably from 45 to 99, more preferably from 50 to 98 mole percent of at least one aliphatic α-olefin having from 2 to 20 carbon atoms.

Other optional polymerizable ethylenically unsaturated monomer(s) include strained ring olefins such as norbornene and $C_{1-10}$ alkyl or $C_{6-10}$ aryl substituted norbornenes, with an exemplary interpolymer being ethylene/styrene/norbornene.

The number average molecular weight (Mn) of the polymers and interpolymers is usually greater than about 5,000. preferably from about 10,000, more preferably from about 20,000, up to about 1,000,000, more preferably up to about 500,000.

Polymerizations and unreacted monomer removal at temperatures above the autopolymerization temperature of the respective monomers may result in formation of some amounts of homopolymer polymerization products resulting from free radical polymerization. For example, while preparing the substantially random interpolymer, an amount of atactic vinyl aromatic homopolymer may be formed due to homopolymerization of the vinyl aromatic monomer at elevated temperatures. The presence of vinyl aromatic homopolymer is in general not detrimental for the purposes of the present invention and can be tolerated. The vinyl aromatic homopolymer may be separated from the interpolymer, if desired by extraction techniques such as selective precipitation from solution with a non solvent for either the interpolymer or the vinyl aromatic homopolymer. For the purpose of the present invention it is preferred that no more than 20 weight percent, preferably less than 15 weight percent based on the total weight of the interpolymers of vinyl aromatic homopolymer is present.

The substantially random interpolymers are optionally modified by typical grafting, hydrogenation, functionalizing, or other reactions. The polymers may be readily sulfonated or chlorinated to provide functionalized derivatives according to established techniques.

The substantially random interpolymers are prepared by polymerizing a mixture of polymerizable monomers in the presence of metallocene, other single-site or constrained geometry catalysts for instance as described in to EP-A-0, 416,815 by James C. Stevens et al. and U.S. Pat. No. 5,703,187 by Francis J. Timmers (which is incorporated herein by reference in its entirety). Preferred operating conditions for such polymerization reactions are pressures from atmospheric up to 3,000 atmospheres and temperatures from −30 C to 200 C.

Examples of suitable catalysts and processes for preparing the substantially random interpolymers are also disclosed in U.S. application Ser. No. 07/702,475, filed May 20, 1991 corresponding to EP-A-514,828; as well as U.S. Pat. Nos.: 5,064,802; 5,132,380; 5,189.192; 5,321,106; 5,347,024; 5,350,723; 5,374,696; 5,399,635, and 5,721,185 all of which patents are incorporated herein by reference in their entirety.

The substantially random α-olefin/vinyl aromatic interpolymers can also be prepared by the processes described by John G. Bradfute et al. (W. R. Grace & Co.) in WO 95/32095; by R. B. Pannell (Exxon Chemical Patents, Inc.) in WO 94/00500; and in *Plastics Technology*, p. 25 (September 1992).

Also suitable are the substantially random interpolymers which comprise at least one α-olefin/vinyl aromatic/vinyl aromatic/α-olefin tetrad disclosed in U. S. application Ser. No. 08/708,809 filed Sep. 4, 1996 by Francis J. T immers, et al. These interpolymers contain additional signals with intensities greater than three times the peak to peak noise. These signals appear in the chemical shift range 43.70–44.25 ppm and 38.0–38.5 ppm. Specifically, major peaks are observed at 44.1, 43.9 and 38.2 ppm. A proton test NMR experiment indicates that the signals in the chemical shift region 43.70–44.25 ppm are methine carbons and the signals in the region 38.0–38.5 ppm are methylene carbons.

In order to determine the $^{13}$C NMR chemical shifts of the interpolymers described, the following procedures and conditions are employed. A five to ten weight percent polymer solution is prepared in a mixture consisting of 50 volume percent 1,1,2,2-tetrachloroethane-$d_2$ and 50 volume percent 0.10 molar chromium tris(acetylacetonate) in 1,2,4-trichlorobenzene. NMR spectra are acquired at 130° C. using an inverse gated degrafting sequence, a 90° pulse width and a pulse delay of five seconds or more. The spectra are referenced to the isolated methylene signal of the polymer assigned at 30.000 ppm.

It is believed that these new signals are due to sequences involving two head-to-tail vinyl aromatic monomer preceded and followed by at least one α-olefin insertion, e.g. an ethylene/styrene/styrene/ethylene tetrad wherein the styrene monomer insertions of said tetrads occur exclusively in a 1,2 (head to tail) manner. It is understood by one skilled in the art that for such tetrads involving a vinyl aromatic monomer other than styrene and an α-olefin other than ethylene that the ethylene/vinyl aromatic monomer/vinyl aromatic monomer/ethylene tetrad will give rise to similar $^{13}$C NMR peaks but with slightly different chemical shifts.

These interpolymers are prepared by conducting the polymerization at temperatures of from −30 C to 250 C in the presence of such catalysts as those represented by the formula (V):

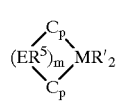

(V)

wherein: each Cp is independently, each occurrence, a substituted cyclopentadienyl group π-bound to M; E is C or Si; M is a group IV metal, preferably Zr or Hf, most preferably Zr; each $R^5$ is independently, each occurrence, H, hydrocarbyl, silahydrocarbyl, or hydrocarbylsilyl, containing up to 30 preferably from 1 to 20 more preferably from 1 to 10 carbon or silicon atoms; each R' is independently, each occurrence, H, halo, hydrocarbyl, hydrocarbyloxy. silahydrocarbyl, hydrocarbylsilyl containing up to 30 preferably from 1 to 20 more preferably from 1 to 10 carbon or silicon atoms or two R' groups together can be a $C_{1-10}$ hydrocarbyl substituted 1,3-butadiene; m is 1 or 2; and optionally, but preferably in the presence of an activating cocatalyst. Particularly, suitable substituted cyclopentadienyl groups include those illustrated by the formula (VI):

(VI)

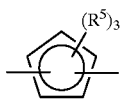

wherein each $R^5$ is independently, each occurrence, H, hydrocarbyl, silahydrocarbyl, or hydrocarbylsilyl, containing up to 30 preferably from 1 to 20 more preferably from 1 to 10 carbon or silicon atoms or two $R^5$ groups together form a divalent derivative of such group. Preferably, $R^5$ independently each occurrence is (including where appropriate all isomers) hydrogen, methyl, ethyl, propyl, butyl, pentyl, hexyl, benzyl, phenyl or silyl or (where appropriate) two such R groups are linked together forming a fused ring system such as indenyl, fluorenyl, tetrahydroindenyl, tetrahydrofluorenyl, or octahydrofluorenyl.

Particularly preferred catalysts include, for example, racemic-(dimethylsilanediyl(2-methyl-4-phenylindenyl)) zirconium dichloride, racemic-(dimethylsilanediyl(2-methyl-4-phenylindenyl))zirconium 1,4-diphenyl-1,3-butadiene, racemic-(dimethylsilanediyl(2-methyl-4-phenylindenyl))zirconium di-$C_{1-4}$ alkyl, racemic-(dimethylsilanediyl(2-methyl-4-phenylindenyl))zirconium di-$C_{1-4}$ alkoxide, or any combination thereof and the like.

Further preparative processes for the interpolymer component of the present invention have been described in the literature. Longo and Grassi (*Makromol. Chem.*, Volume 191, pages 2387 to 2396 [1990]) and D'Anniello et al. (Journal of Applied Polymer Science, Volume 58, pages 1701–1706 [1995]) reported the use of a catalytic system based on methylalumoxane (MAO) and cyclopentadienyltitanium trichloride ($CpTiCl_3$) to prepare an ethylene-styrene copolymer. Xu and Lin (*Polymer Preprints, Am.Chem.Soc., Div.Polym.Chem.*) Volume 35, pages 686,687 [1994]) have reported copolymerization using a $MgCl_2/TiCl_4/NdCl_3/Al(iBu)_3$ catalyst to give random copolymers of styrene and propylene. Lu et al (*Journal of Applied Polymer Science*, Volume 53, pages 1453 to 1460 [1994]) have described the copolymerization of ethylene and styrene using a $TiCl_4/NdCl_3/MgCl_2/Al(Et)_3$ catalyst. Sernetz and Mulhaupt, (*Macromol. Chem. Phys.*, v. 197, pp 1071–1083, 1997) have described the influence of polymerization conditions on the copolymerization of styrene with ethylene using $Me_2Si(Me_4Cp)(N-tert-butyl)TiCl_2$/methylaluminoxane Ziegler-Natta catalysts. The manufacture of α-olefin/vinyl aromatic monomer interpolymers such as propylene/styrene and butene/styrene are described in U.S. Pat. No. 5,244,996, issued to Mitsui Petrochemical Industries Ltd. All the above U.S. patents for preparing the interpolymer component are incorporated herein by reference.

Azidosilane

Any monofunctional azidosilane can be used as the grafting agent for this invention. A monofunctional azidosilane is a compound which has one azide group. Preferably the monofunctional azidosilane is either a sulfonylazidosilane or a carbonvyazidosilane, more preferably a sulfonylazidosilane, most preferably 2-(4-azidosulfonylphenyl)-ethyltrimethoxysilane. Processes of preparing azidosulfonylsilanes are described in U.S. Pat. No. 3,697,551, incorporated herein by reference for the pertinent disclosure.

The preferred azidosilane compounds have either of the following general structures (VII) or (VIII), more preferably structure (VII):

(VII) Sulfonylazidosilane

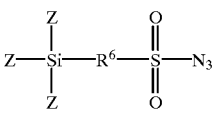

(VIII) Carbonylazidosilane

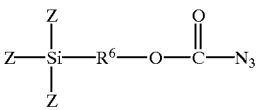

where $R^6$ is any organic radical; and Z is, independently each occurrence, a hydrogen, an organic radical or other hydrolyzable group (including, inter alia, alkoxy group), or a halogen. $R^6$ is generally selected from the group consisting of hydrocarbon, halo-substituted hydrocarbon, hydrocarbon-oxyhydrocarbon, hydrocarbon-thiocarbon, and hydrocarbonsulfonyl-hydrocarbon divalent radicals. Preferably, $R^6$ will have a long aliphatic component to improve miscibility of the polar azidosilane with the typically non-polar polymers.

In preferred embodiments $R^6$ will be a divalent radical selected from the group consisting of alkylene radicals such as the straight chain and branched $C_1$ to $C_{20}$ more preferably. $C_3$ to $C_{20}$, alkenyl radicals which include, for instance, the methylene, ethylene, trimethylene, tetramethylene, pentamethylene, hexamethylene, octamethylene, decamethylene, dodecamethylene, octadecamthylene, and the like radicals; cycloalkylene radicals such as the $C_3$ to $C_{20}$ cycloalkylene radicals which include, for instance, the cyclohexylene, cyclopentylene, cyclooctylene, cyclobutylene, and the like radicals, more preferably the cycloalkylene will be connected to the silicon atom by a straight chain alkylene of 1 to about 20 methylene groups. even more preferably, the cycloalkylene connected via the chain of methylene groups is cyclohexane; arylene radicals such as o-, m- and p-phenylene, naphthylene, biphenylene, and the like radicals; arylene-alkylene radicals, where the alkylene portion consists of a straight chain of 2 to about 20 methylene groups; arylene-dialkylene radicals, such as o-, m-, p-xylene diethylene, o-, m-, p-phenylene diethylene, and the like radicals; alkylene-diarylene radicals such as methylene bis (o-, m-, p-phenylene), ethylene bis (o-, m-, p-phenylene), and the like radicals; cycloalkylenediakylene radicals such as 1,2- and 1,3- and 1,4-cyclohexanedimethylene, 1,2- and 1,3-cyclopentane dimethylene, and the like radicals; and the alkylene-oxy-alkylene radicals, arylene-oxy-arylene radicals, aralkylene-oxyarylene radicals, alkyarylene-oxyalkarylene radicals, aralkylene-oxyoaralkylenc radicals and the like; as well as the corresponding thio and sulfonyl radicals, specific examples of which include ethylene-oxyethylene, propylene-oxybutylene, phenylene-oxyphenylene, methylenephenylene-oxy-phenylene-methylene, phenylene-methylene-oxymethylenephenylene, ethylene-thio-ethylene, phenylene-thio-phenylene, phenylene-methylene-thiomethylene-phenylene, butylene-sulfonyl-butylene, and the like radicals. It will, of course, be obvious to those skilled in the art that $R^6$ can contain other functional groups which are substantially inert to the reactions in which these compounds are used, such as esters, sulfonate esters, amides, sulfonamides, urethanes and the like.

The preferred structure for $R^6$ are: a straight chain of between 3 to 20 methylene groups; a cyclohexane with a straight chain aliphatic component of between 0 to 20 methylene groups; and, a phenyl with a straight chain aliphatic component of between 2 to 20 methylene groups.

Z may be a hydrolyzable radical. Typical hydrolyzable radicals are the halo radicals which include, for instance, the fluoro, chloro, bromo, and iodo, radicals; the alkoxy radicals including the $C_1$ to $C_{20}$ straight and branched chain alkoxy radicals such as methoxy, ethyoxy, propoxy, butoxy, isobutoxy, octadecyloxy and the like; the aryloxy radicals such as phenoxy, and the like; the organo oxycarbonyl radicals including the aliphatic oxycarbonyl radicals such as acetoxy, propionyloxy, stearoyl oxy, and the like; the cycloaliphatic oxycarbonyl radicals such as cyclohexylcarbonyloxy, and the like; the aromatic oxycarbonyl radicals such as benxoyloxy, xyloxy, and the like.

Z may also be a radical of preferably 1–20 carbons, more preferably 1–5 carbons, provided that at least one Z comprises a hydrolyzable group. Representative radicals are selected from the group consisting of alkyl, cycloalkyl, aryl, alkaryl, aralkyl radicals such as methyl, ethyl, propyl, isopropyl, butyl, hexyl, cyclohexyl, cycloheptyl, phenyl, tolyl, benxyl, xylyl, and the like.

Preferred azidosilanes for the practice of this invention have the following properties. The melting point of the azidosilane is preferably less than about 150 C, more preferably less than the melting point of the polymer to be grafted. The boiling point of the azidosilane is preferably greater than about 200 C. The decomposition temperature of the azidosilane is preferably higher than the melting point of the polymer to be grafted, more preferably between about 170 C and about 200 C. The azidosilane is miscible with the ESI or metallocene LLDPE, preferably through including a long chain aliphatic component in the azidosilane molecule, more preferably the long chain aliphatic group is up to about 20 methylene groups. The azidosilane and polyolefin preferably react at a temperature at least the decomposition temperature of the azidosilane and, more preferably, greater than about 150 C, most preferably at least about 170 C. The decomposition temperature is measured by heating a sample (about 1.5 mg), in a DSC, from a temperature of 20 C to 400 C at a rate of 10 C/min.

Specific azidosulfonyl silanes include among others, 5-(trimethoxysilyl)-5 amylsulfonyl azide, 4-(triethoxysilyl)-cyclohexylsulfonyl azide, 2-methyl-4(trichlorosilyl)-butylsulfonyl azide, 6-(trimethoxysilyl)-hexylsulfonyl azide, 2-(trichlorosilyl)-ethylsulfonyl azide, 2-(triethoxysilyl)-ethylsulfonyl azide, 3-(methyldimethoxysilyl)-propylsulfonyl azide, 3-(trimethoxysilyl)-propylsulfonyl azide, 4-(trimethoxysilyl)-benzenesulfonyl azide, 2-(trimethoxysilyl)-ethylbenzenesulfonyl azide and the like.

Other representative examples of the azidosilane compound are γ-(azidosulfonyl)-propyltrimethoxy silane, γ-(azidosulfonyl)-propyltriethoxy silane, γ-(azidosulfonyl)-propyltributoxy silane, 2-(azidosulfonyl)-propyltripropoxy silane, 4-(azidosulfonyl)-phenyltrimethoxy silane, 4-(azidosulfonyl)-phenyltriethoxy silane, 4-(azidosulfonyl)-phenyltributoxy silane, 4-(azidosulfonyl)-phenyltripropoxy silane, 3-(azidosulfonyl)-phenyltrimethoxy silane, 3-(azidosulfonyl)-phenyltriethoxy silane, 3-(azidosulfonyl)-phenyltributoxy silane, 3-(azidosulfonyl)-phenyltripropoxy silane, γ-(azidocarbonyl)-propyltrimethoxy silane, γ-(azidocarbonyl)-propyltriethoxy silane, 2-(azidocarbonyl)-propyltripropoxy silane, γ-(azidocarbonyl)-propyltributoxy silane, 4-(azidocarbonyl)-phenyltrimethoxy silane, 4-(azidocarbonyl)-phenyltriethoxy silane, 4-(azidocarbonyl)-phenyltripropoxy silane, 4-(azidocarbonyl )-phenyltributoxy si lane, 3-(azidocarbonyl)-phenyltrimethoxy silane, 3-(azidocarbonyl)-phenyltriethoxy silane, 3-(azidocarbonyl)-phenyltripropoxy silane, 3-(azidocarbonyl)-phenyltributoxy silane, 2-(azidosulfonyl)-propyldimethoxy(methyl) silane, γ-(azidosulfonyl)-propyldicthoxy(methyl) silane, γ-(azidosulfonyl)-propyidipropoxy(methyl) silane, γ-(azidosulfonyl)-propyldibutoxy(methyl) silane, 4-(azidosulfonyl)-phenyldimethoxy(methyl) silane, 4-(azidosulfonyl)-phenyldiethoxy(methyl) silane, 4-(azidosulfonyl)-phenyldipropoxy(methyl)silane, 4-(azidosulfonyl)-phenyldibutoxy(methyl) silane, 3-(azidosulfonyl)-phenyldimcthoxy(methyl) silane, 3-(azidosulfony l)-pheiyldiethoxy(methyl)silane, 3-(azidosulfonyl)-phenyldipropoxy(methyl) silane, 3-(azidosulfonyl)-phenyldibutoxy(methyl) silane, γ-(azidocarbonyl)-propyldimethoxy(methyl) silane, 2-(azidocarbonyl)-propyldiethoxy(methyl) silane, γ-(azidocarbonyl)-propyldipropoxy(methyl) silane, γ-(azidocarbonyl)-propyldibutoxy(methyl) silane, 4-(azidocarbonyl)-phenyldimethoxy(methyl) silane, 4-(azidocarbonyl)-phenyldiethoxy(methyl) silane, 4-(azidocarbonyl)-phenyldipropoxy(methyl) silane, 4-(azidocarbonyl)-phenyldibutoxy(methyl) silane, 3-(azidocarbonyl)-phenyldimethoxy(methyl) silane, 3-(azidocarbonyl)-phenyldiethoxy(methyl) silane, 3-(azidocarbonyl)-phenyldipropoxy(methyl) silane, 3-(azidocarbonyl)-phenyldibutoxy(methyl) silane, etc.

Composition

The subject matter of the invention includes incorporating at least one second polymer with the first polymer. The second polymer may be any polyolefinic polymer. Examples of suitable polymers for use as the second polymer include any of the α-olefin/vinyl aromatic interpolymers, HEPs, or SLEPs as described for use as the first polymer. Preferably, these α-olefin/vinyl aromatic interpolymers, HEPs, or SLEPs have a different comonomer content, melt index, and/or density than the first polymer. Additionally, the second polymer can be any other polyolefin, such as polyethylene, polypropylene, HDPE, LDPE, LLDPE, and the like, made with metallocene, other single-site, or Ziegler Natta catalysts.

Practice of this invention is also applicable to blends of two or more polymers, especially polyethylene, ethylene α-olefin copolymers or a combination thereof, at least one of which is prepared using a single site catalyst which polymers have different average molecular weights. The higher average molecular weight is preferably more than about 10 percent greater than the lower average molecular weight in a blend of two polymer components. When there are more than two polymer components the highest and the lowest molecular weight are about 10 percent different from the molecular weight of the middle molecular weight component. TIhe resulting blend, thus optionally has a Mw/Mn greater than 3.0 preferably greater than 3.5 even though at least one component individually has an MWD less than about 3. If the higher average molecular weight of one polymer component is about 30 percent or more greater than that of another component of the blend, the blend often exhibits more than one peak on a gel permeation chromatography (GPC) curve analysis.

These polymers include homogeneous linear ethylene polymers such as (a) those described in U.S. Pat. No.

3,645,992, and (b) those made using the so-called single site catalysts in a batch reactor having relatively high olefin concentrations as described, for example, in U.S. Pat. No. 5,026,798 and 5,055,438. Such polymers are commercially available. Representative of commercially available homogeneous linear ethylene polymers are TAFMER™ polymers made by Mitsui Petrochemical Industries, Ltd. and EXACT™ polymers made by Exxon Chemical Co. Each of the U.S. patents cited in this paragraph are incorporated herein by reference.

The second polymer may be incorporated with the first polymer either before or after grafting.

The silane-grafted polymers and intermediates used to make silane-grafted polymers may be used alone or in combination with one or more additional polymers in a polymer blend. When additional polymers are present, they may be selected from any of the modified or unmodified homogeneous polymers described above for this invention and/or any modified or unmodified heterogeneous polymers.

Heterogeneous polyethylenes that are optionally combined with the silane-grafted polymers according to this invention fall into two broad categories, those prepared with a free radical initiator at high temperature and high pressure, and those prepared with a coordination catalyst at high temperature and relatively low pressure. The former are generally known as low density polyethylenes (LDPE) and are characterized by branched chains of polymerized monomer units pendant from the polymer backbone. LDPE polymers generally have a density between about 0.910 and 0.935 g/cc. Ethylene polymers and copolymers prepared by the use of a coordination catalyst, such as a Ziegler Natta or Phillips catalyst, are generally known as linear polymers because of the substantial absence of branch chains of polymerized monomer units pendant from the backbone. High density polyethylene (HDPE), generally having a density of about 0.941 to about 0.965 g/cc, is typically a homopolymer of ethylene, and it contains relatively few branch chains relative to the various linear copolymers of ethylene and an α-olefin. HDPE is well known, commercially available in various grades, and may be used in this invention. Density is measured according to the procedure of ASTM D-792.

Linear copolymers of ethylene and at least one α-olefin of 3 to 12 carbon atoms, preferably of 4 to 8 carbon atoms, are also well known and commercially available. As is well known in the art, the density of a linear ethylene/α-olefin copolymer is a function of both the length of the α-olefin and the amount of such monomer in the copolymer relative to the amount of ethylene, the greater the length of the α-olefin and the greater the amount of α-olefin present, the lower the density of the copolymer. Linear low density polyethylene (LLDPE) is typically a copolymer of ethylene and an α-olefin of 3 to 12 carbon atoms, preferably 4 to 8 carbon atoms (e.g., 1-butene, 1-octene, etc.), that has sufficient α-olefin content to reduce the density of the copolymer to that of LDPE. When the copolymer contains even more α-olefin, the density will drop below about 0.91 g/cc and these copolymers are known as ultra low density polyethylene (ULDPE) or very low density polyethylene (VLDPE). The densities of these linear polymers generally range from about 0.87 to 0.91 g/cc.

Both the materials made by the free radical catalysts and by the coordination catalysts are well known in the art, as are their processes of preparation. Heterogeneous linear ethylene polymers are available from The Dow Chemical Company as DOWLEX™ LLDPE and as ATANE™ ULDPE resins. Heterogeneous linear ethylene polymers can be prepared via the solution, slurry or gas phase polymerization of ethylene and one or more optional α-olefin comonomers in the presence of a Ziegler Natta catalyst, by processes such as are disclosed in U.S. Pat. No. 4,076,698 to Anderson et al., which is incorporated herein by reference. Preferably, heterogeneous ethylene polymers are typically characterized as having molecular weight distributions, Mw/Mn, in the range of from 3.5 to 4.1. Relevant discussions of both of these classes of materials, and their processes of preparation are found in U.S. Pat. No. 4,950,541 and the patents to which it refers, all of which are incorporated herein by reference.

Silane-grafting Process

For silane-grafting, the azidosilane is admixed with the polymer and heated to at least the decomposition temperature of the azidosilane.

The invention further includes a process for producing a water-curable silane-grafted polymer comprising:

(A) admixing (i) at least one first polymer, the first polymer selected from the group consisting of an interpolymer, a substantially linear ethylene polymer (SLEP), and a mixture thereof; the interpolymer comprising polymer units of at least one α-olefin and at least one vinylidene aromatic compound; and (ii) at least one monofunctional azidosilane, the azidosilane having a decomposition temperature; and (B) heating the polymer/azidosilane mixture of (A) to at least the decomposition temperature of the azidosilane to form the water-curable silane-grafted polymer. The extent of reaction is a function of time and temperature. At the low levels of azide used in the practice of the invention, the optimal properties are not reached until the azide is essentially fully reacted. Temperatures for use in the practice of the invention are also determined by the softening or melt temperatures of the polymer starting materials. For these reasons, the temperature is advantageously greater than about 90 C, preferably greater than about 120 C, more preferably greater than about 150 C, most preferably greater than 180 C.

Preferred times at the desired decomposition temperatures are times that are sufficient to result in reaction of the grafting ag,ent with the polymer(s) without undesirable thermal degradation of the polymer matrix. Preferred reaction times in terms of the half life of the grafting agent, that is the time required for about half of the agent to be reacted at a preselected temperature, which half life is determinable by DSC (scanning at 10 C/min) is about 5 half lives of the grafting agent. In the case of an azidosilane, for instance, the reaction time is preferably at least about 4 minutes at 200 C.

The azidosilane is present in an amount greater than 0%, preferably at least 0.01%, up to about 10%, preferably up to about 5%. The preferred level of azidosilane addition depends on both the molecular weight of the polymer to be crosslinked and the degree of crosslinking desired. The degree of crosslinking is measured by solvent extraction and is expressed as percent gel. The cured polymer of this invention has a degree of crosslinking of at least about 20% gel, preferably at least about 60% gel, and more preferably at least about 90% gel. TIypically, the lower the molecular weight of the polymers the more azidosilane crosslinking agent required to achieve a given degree of crosslinking.

Admixing of the polymer and grafting agent is conveniently accomplished by any means within the skill in the art. Desired distribution is different in many cases, depending on what rheological properties are to be modified. In a homopolymer it is desirable to have as homogeneous a distribution as possible, preferably achieving solubility of the azide in the polymer melt. In a blend it is desirable to have low solubility in one or more of the polymer matrices such that the azide is preferentially in one or the other phase, or predominantly in the interfacial region between the two phases.

Preferred processes include at least one of (a) dry blending the grafting agent with the polymer, preferably to form a substantially uniform admixture and adding this mixture to melt processing equipment, e.g. a melt extruder to achieve the grafting reaction, at a temperature at least the decomposition temperature of the grafting agent; (b) introducing, e.g. by injection, a grafting agent in liquid form, e.g. dissolved in a solvent therefor or in a slurry of grafting agent in a liquid, into a device containing polymer, preferably softened, molten or melted polymer, but alternatively in particulate form, in solution or dispersion, more preferably in melt processing equipment; (c) forming a first admixture of a first amount of a first polymer and a grafting agent, advantageously at a temperature less than about the decomposition temperature of the grafting agent, preferably by melt blending, and then forming a second admixture of the first admixture with a second amount of a second polymer (for example a concentrate of a grafting agent admixed with at least one polymer) and optionally other additives, is conveniently admixed into a second polymer or combination thereof optionally with other additives, to modify the second polymer(s); (d) feeding at least one grafting agent, preferably in solid form, more preferably finely comminuted, e.g. powder, directly into softened or molten polymer, e.g. in melt processing equipment, e.g. in an extruder; or combinations thereof. Among processes (a) through (d), processes (b) and (c) are preferred, with (c) most preferred. For example, process (c) is conveniently used to make a concentrate with a first polymer composition having a lower melting temperature, advantageously at a temperature below the decomposition temperature of the grafting agent, and the concentrate is melt blended into a second polymer composition having a higher meltin(g temperature to complete the grafting reaction. Concentrates are especially preferred when temperatures arc sufficiently high to result in loss of grafting agent by evaporation or decomposition not leading to reaction with the polymer, or other conditions would result that effect. Alternatively, some grafting occurs during the blending of the first polymer and grafting agent, but some of the grafting agent remains unreacted until the concentrate is blended into the second polymer composition. Each polymer or polymer composition includes at least one homopolymer, copolymer, terpolymer, or other interpolymer and optionally includes additives within the skill in the art. When the grafting agent is added iii a dry form it is preferred to mix the agent and polymer in a softened or molten state below the decomposition temperature of the grafting agent then to heat the resulting admixture to a temperature at least equal to the decomposition temperature of the grafting agent.

The term "melt processing" is used to mean any process in which the polymer is softened or melted, such as extrusion, pelletizing, molding, thermoforming, film blowing, compounding in polymer melt form, fiber spinning, and the like.

The polyolefin(s) and grafting agent are suitably combined in any manner which results in desired reaction thereof, preferably by mixing the grafting agent with the polymer(s) under conditions which allow sufficient mixing before reaction to avoid uneven amounts of localized reaction then subjecting the resulting admixture to heat sufficient for reaction. Preferably, a substantially uniform admixture of grafting agent and polymer is formed before exposure to conditions in which grafting takes place. Thus, preferably, in the practice of the invention, decomposition of the grafting agent occurs after mixing sufficient to result in a substantially uniform admixture of grafting agent and polymer. This mixing is preferably attained with the polymer in a molten or melted state, that is above the crystalline melt temperature, or in a dissolved or finely dispersed condition rather than in a solid mass or particulate form. The molten or melted form is more preferred to insure homogeneity rather than localized concentrations at the surface.

Any equipment is suitably used, preferably equipment which provides sufficient mixing and temperature control in the same equipment, but advantageously practice of the invention takes place in such devices as an extruder or a static polymer mixing device such as a Brabender blender. The term extruder is used for its broadest meaning to include such devices as a device which extrudes pellets or pelletizer. Conveniently, when there is a melt extrusion step between production of the polymer and its use, at least one step of the process of the invention takes place in the melt extrusion step. While it is within the scope of the invention that the reaction take place in a solvent or other medium, it is preferred that the reaction be in a bulk phase to avoid later steps for removal of the solvent or other medium. For this purpose, a polymer with a crystalline melt temperature is advantageous for even mixing and for reaching a reaction temperature (the decomposition temperature of the azidosilane).

In a preferred embodiment the process of the present invention takes place in a single vessel, that is mixing of the grafting agent and polymer takes place in the same vessel as heating to the decomposition temperature of the grafting agent. The vessel is preferably a twin-screw extruder, but is also advantageously a single-screw extruder, a batch mixer, or a static mixing zone for mixing polymer at the back end of a production process. The reaction vessel more preferably has at least two zones of different temperatures into which a reaction mixture would pass, the first zone advantageously being at a temperature at least the crystalline melt temperature or the softening temperature of the polymer(s) and preferably less than the decomposition temperature of the grafting agents and the second zone being at a temperature sufficient for decomposition of the grafting agent. The first zone is preferably at a temperature sufficiently high to soften the polymer and allow it to combine with the grafting agent through distributive mixing to a substantially uniform admixture.

For polymers that have softening points above the grafting agent decomposition temperature (preferably greater than 220 C), and especially when incorporation of a lower melting polymer (such as in a concentrate) is undesirable, the preferred embodiment for incorporation of grafting agent is to solution blend the grafting agent in solution or admixture into the polymer, to allow the polymer to imbibe (absorb or adsorb at least some of the grafting agent), and then to evaporate the solvent. After evaporation, the resulting mixture is extruded. The solvent is preferably a solvent for the grafting agent, and more preferably also for the polymer when the polymer is soluble. Such solvents include polar solvents such as acetone, THF (tetrahydrofuran) and chlorinated hydrocarbons such as methylene chloride. Alternatively other non-polar compounds such as mineral oils in which the grafting agent is sufficiently miscible to disperse the grafting agent in a polymer, are used.

To avoid the extra step and resultant cost of re-extrision and to insure that the grafting agent is well blended into the polymer, in alternative preferred embodiments it is preferred that the grafting agent be added to the post-reactor area of a polymer processing plant. For example, in a slurry process of producing polyethylene, the grafting agent is added in either powder or liquid form to the powdered polyethylene after the solvent is removed by decantation and prior to the drying and densification extrusion process. In an alternative embodiment, when polymers are prepared, in a gas phase process, the grafting agent is preferably added in either powder or liquid form to the powdered polyethylene before the densification extrusion. In an alternative embodiment when a polymer is made in a solution process, the grafting agent is preferably added to the polymer melt stream after devolatilization and before the pelletizing extrusion process.

Articles

There are many types of molding operations which can be used to form useful fabricated articles or parts from the formulations disclosed herein, including various injection molding processes (e.g., that described in *Modern Plastics Encyclopedia*/89, Mid October 1988 Issue, Volume 65, Number 11, pp. 264–268, "Introduction to Injection Molding" and on pp. 270–271, "Injection Molding Thermoplastics", and blow molding processes (e.g., that described in *Modern Plastics Encyclopedia*/89, Mid October 1988 Issue, Volume 65, Number 11, pp. 217–218, "Extrusion-Blow Molding", profile extrusion, calendering, pultrusion and the like.

The silane-grafted ethylene polymers, processes for making them, and intermediates for making them of this invention are useful in the automotive area, industrial goods, building and construction, electrical (e.g., wire and cable coatings/insulation) and tire products. Some of the fabricated articles include automotive hoses, single ply roofing, and wire and cable voltage insulation and jackets.

Such articles comprising the silane-grafted polymer of this invention may be made by melt processing the silane-grafted polymer according to this invention. That process may include processing pellets or granules of polymer which have been silane-grafted according to this invention. In a preferred embodiment, the pellets or granules are substantially free of unreacted grafting agent when the grafting agent comprises a heat-activated grafting agent.

The low density ethylene copolymer preferred embodiments (density less than about 0.90 g/cc and comonomer content preferably about 5–25 mole percent) are particularly useful in extrusion such as to form wire and cable coatings, tubing, profiles such as gaskets and seals, sheeting, extrusion coatings such as carpet backing, multilayer packaging, tougheners, and impact modifiers for blends of polymers, preferably for wire and cable coating, tougheners and impact modifiers. The low density preferred embodiments are also particularly useful for calendaring to form such materials as sheeting, packaging films, and non-packaging films; for foams particularly cushion packaging, toys, building and construction uses, automotive uses, body boards, airline seats, floral and craft uses, preferably cushion packaging, building and construction, automotive uses, and body boards; and for adhesives and sealants, particularly hot melt adhesives, pressure sensitive adhesives (whether applied in solvents or by hot melt), caulks, and as tackifiers in other compositions.

Film and film structures particularly benefit from this invention and can be made using conventional hot blown film fabrication techniques or other biaxial orientation processes such as tenter frames or double bubble processes. Conventional hot blown film processes are described, for example, in *The Encyclopedia of Chemical Technology*, Kirk-Othmer, Third Edition, John Wiley & Sons, New York, 1981, vol. 16, pp. 416–417 and Vol. 18, pp. 191–192. Biaxial orientation film manufacturing process such as described in a "double bubble" process as in U.S. Pat. No. 3,456,044 (Pahlke), and the processes described in U.S. Pat. No. 4,352,849 (Mueller), U.S. Pat. No. 4,597,920 (Golike), U.S. Pat. No. 4,820,557 (Warren), U.S. Pat. No. 4,837,084 (Warren), U.S. Pat. No. 4,865,902 (Golike et al.), U.S. Pat. No. 4,927,708 (Herran et al.), U.S. Patent 4,952,451 (Mueller), U.S. Pat. No. 4,963,419 (Lustig et al.), and U.S. Pat. No. 5,059,481 (Lustig et al.), can also be used to make film structures from the novel compositions described herein. The film structures can also be made as described in a tenter-frame technique, such as that used for oriented polypropylene.

Other multi-layer film manufacturing techniques for food packaging applications are described in *Packaging Foods With Plastics*, by Wilmer A. Jenkins and James P. Harrington (1991), pp. 19–27, and in "Coextrusion Basics" by Thomas I. Butler, *Film Extrusion Manual: Process, Materials, Properties* pp. 31–80 (published by the TAPPI Press (1992)).

The films may be monolayer or multilayer films. The film made using this invention can also be coextruded with the other layer(s) or the film can be laminated onto another layer(s) in a secondary operation, such as that described in *Packaging Foods With Plastics*, by Wilmer A. Jenkins and James P. Harrington (1991) or that described in "Coextrusion For Barrier Packaging" by W. J. Schrenk and C. R. Finch, *Society of Plastics Engineers RETEC Proceedings*, June 15–17 (1981), pp. 211–229. If a monolayer film is produced via tubular film (i.e., blown film techniques) or flat die (i.e., cast film) as described by K. R. Osborn and W. A. Jenkins in "Plastic Films, Technology and Packaging Applications" (Technomic Publishing Co., Inc., 1992), then the film must go through an additional post-extrusion step of adhesive or extrusion lamination to other packaging material layers to form a multilayer structure. If the film is a coextrusion of two or more layers (also described by Osborn and Jenkins), the film may still be laminated to additional layers of packaging materials, depending on the other physical requirements of the final film. "Laminations vs. Coextrusion" by D. Dumbleton (Converting Magazine (September 1992), also discusses lamination versus coextrusion. Monolayer and coextruded films can also go through other post extrusion techniques, such as a biaxial orientation process.

Extrusion coating is yet another technique for producing multilayer film structures using the novel compositions described herein. The novel compositions comprise at least one layer of the film structure. Similar to cast film, extrusion coating is a flat die technique. A sealant can be extrusion coated onto a substrate either in the form of a monolayer or a coextruded extrudate.

Generally for a multilayer film structure, the novel compositions described herein comprise at least one layer of the total multilayer film structure. Other layers of the multilayer structure include but are not limited to barrier layers, and/or tie layers, and/or structural layers. Various materials can be used for these layers, with some of them being used as more than one layer in the same film structure. Some of these materials include: foil, nylon, ethylene/vinyl alcohol (EVOH) copolymers, polyvinylidene chloride (PVDC), polyethylene terephthalate (PET), oriented polypropylene (OPP), ethylene/vinyl acetate (EVA) copolymers, ethylene/acrylic acid (EAA) copolymers, ethylene/methacrylic acid (EMAA) copolymers, LLDPE, HDPE, LDPE, nylon, graft adhesive polymers (e.g., maleic anhydride grafted polyethylene), and paper. Generally, the multilayer film structures comprise from 2 to 7 layers.

Curing

The silane-grafted polymers of this invention are water curable. That is, in the presence of water the silicons of two silane groups each bond to a single oxygen atom thereby creating a crosslink between the sites of the two silane groups. The term crosslink refers to the attachment of two chains of polymer molecules by bridges, composed of either an element, a group, or a compound, which joins certain carbon atoms of the chains by primary chemical bonds. In the case of this invention, the crosslink bridge has the formula (IX) of:

$$-R^7-Si-O-Si-R^8-, \quad (IX)$$

where $R^7$ and $R^8$ are any organic radicals having a nitrogen which is attached by a primary chemical bond to a carbon atom on a polymer chain. The organic radicals $R^7$ and $R^8$ are the reaction products of a thermally decomposed azidosilane and a polymer chain as described in this invention. The current invention anticipates using two or more different azidosilanes as grafting agents, especially where the different azidosilanes have different decomposition temperatures.

The water can be introduced to the silane-grafted polymer as vapor, steam, liquid or a combination. Generally, atmospheric moisture is sufficient to cure the silane-grafted polymer in about two days. Increased curing rates can be achieved by use of artificially humidified air, immersion in water, preferably hot water, or exposure to steam. The rate of curing is also increased by curing at higher temperatures, preferably at least 23 C, more preferably at least 70 C, up to preferably about 100 C, more preferably a temperature above about 100 C but below the softening point of the silane-grafted polymer.

The curing can optionally and preferably be carried out in the presence of a silanol condensation catalyst. Such catalysts are known in the art. Such materials include metal carboxylates such as dibutyltin dilaurate, organic bases such as ethylamine, hexylamine, dibutylamine, piperidine and the like, and acids such as mineral acids and fatty acids and the like. Preferably the catalyst is a metal carboxylate, more preferably dibutyltin dilaurate.

The following examples are to illustrate this invention and do not limit it. Ratios, parts, and percentages are by weight unless otherwise stated. Examples (Ex) of the invention are designated numerically while comparative examples (C.E.) are designated alphabetically and are not examples of the invention.

Test Methods:

A Perkin Elmer model TMA 7 thermomechanical analyzer is used to measure the upper service temperature. Probe force of 102g and heating rate of 5° C./min were used. Each test specimen is a disk with thickness of about 2 mm and a diameter of about 7 mm prepared by compression molding at 205° C. and air-cooling to room temperature.

The melt index is measured according to ASTM-D-1238 Condition 190 C/2.16Kg.

Xylene Extraction is performed by weighing out 1 gram samples of polymer. The samples are transferred to a mesh basket which is then placed in boiling xylene for 12 hours. After 12 hours, the sample baskets are removed and placed in a vacuum oven at 150° C. and 28 in. of Hg vacuum for 12 hours. After 12 hours, the samples are removed, allowed to cool to room temperature over a 1 hour period, and then weighed. The results are reported as percent polymer extracted. Percent polymer extracted=(initial weight-final weight)/initial weight according to ASTM D-2765 Procedure "A" Samples are prepared using either a mixer commercially available from Haake, Inc. under the trade designation Haake Buchler Rheomix 600 mixer with roller style blades, attached to a rheometer commercially available from Haake, Inc. under the trade designation Haake Buchler Rheocord 9000 Torque rheometer, or using a Brabender mixer (Type R.E.E. No. A-19/S.B) with a 50 g mixing bowl.

TABLE OF REAGENTS

Polymers

SM8400—An ethylene/octene copolymer commercially produced by DuPont Dow Elastomers via solution process using INSITE™ technology. This polymer has a density of 0.870 g/cm$^3$ and a melt index of 30 g/10 min.

EG8100—An ethylene/octene copolymer commercially produced by DuPont Dow Elastomers via solution process using INSITE™ technology. This polymer has a density of 0.870 g/cm$^3$ and a melt index of 1 g/10 min.

ES31—An experimental ethylene/styrene copolymer produced via continuous solution process using INSITE™ Technology. The copolymer contains 10.88 mole % (31.2 wt %) styrene and 89.1 mole % (68.8 wt %) ethylene. This polymer contains less than 1 weight percent homopolymer polystyrene impurity. The sample has a melt index of 10.7 g/10 min. and $I_{10}/I_2$ of 6.8. ES31 is prepared as described below.

ES41—An experimental ethylene/styrene copolymer produced via continuous solution process using INSITETM Technology. The copolymer contains 15.8 mole % (41 wt %) styrene and 84.2 mole % (59 wt %) ethyiene. This polymer contains less than 1 weight percent homopolymer polystyrene impurity. The sample has a melt index of 1.3 g/10 min. ES41 is prepared as described below.

ES51—An experimental ethylene/styrene copolymer produced via continuous solution process using INSITE™ Technology. The copolymer contains 21.9 mole % (51 wt %) styrene and 78.1 mole % (49 wt %) ethylene. This polymer contains less than 1 weight percent homopolymer polystyrene impurity. The sample has a melt index of 1.2 g/10 min. ES51 is prepared as described below.

ES58—An experimental ethylene/styrene copolymer produced via continuous solution process using INSITE™ Technology. The copolymer contains 27.1 mole % (58 wt %) styrene and 72.9 mole % (42 wt %) ethylene. This polymer contains 3 weight percent homopolymer polystyrene impurity and the sample was dusted with 3000 ppm calcium stearate (Aldrich). The sample has a melt index of 1.0 g/10 min. ES58 is prepared as described below.

ES69—An experimental ethylene/styrene copolymer produced via continuous solution process using INSITE™ Technology. The copolymer contains 37.5 mole % (69 wt %) styrene and 62.5 mole % (31 wt %) ethylene. This polymer contains 2 weight percent homopolymer polystyrene impurity. The sample has a melt index of 1.2 g/10 min. ES69 is prepared as described below.

ES72—An experimental ethylene/styrene copolymer produced via continuous solution process using, INSITE™ Technology. The copolymer contains 40.9 mole% (72 wt %) styrene and 59.1 mole % (28 wt %) ethylene. This polymer contains 3 weight percent homopolymer polystyrene impurity. The sample has a melt index of 1.2 g/10 min. ES72 is prepared as described below.

ES73—An experimental ethylene/styrene copolymer produced via continuous solution process using INSITE™ Technology. The copolymer contains 42.6 mole % (73.4 wt %) styrene and 57.4 mole % (26.6 wt %) ethylene. This polymer also contains 8.6 weight percent homopolymer polystyrene as an impurity. The sample has a melt index of 5.0 g/10 min. ES73 is prepared as described below.

Preparation of Polymers Used

Interpolymers of α-olefins and vinyl aromatic polymers used in the examples are also referred to herein as Ethylene Styrene Interpolymers (ESI) and are synthesized according to the following general procedure:

Reactor Description

A 6 gallon (22.7 L), oil jacketed, autoclave continuously stirred tank reactor (CSTR) is employed as the reactor. A magnetically coupled agitator with impellers commercially available from Lightning Mixers, Inc. under the trade designation A-320 impellers provides the mixing. The reactor ran liquid full at 475 psig (3,275 kPa). Process flow is in the bottom and out the top. A heat transfer oil is circulated through the jacket of the reactor to remove some of the heat of reaction. After the exit from the reactor there is a flow meter that measured flow and solution density. All lines on the exit of the reactor are traced with 50 psi (344.7 kPa) steam and insulated.

Procedure

Solvent (ethylbenzene or toluene) is supplied to the reactor at 30 psig (207 kPa). The feed to the reactor was measured by a mass flow meter. A variable speed diaphragm pump controls the feed rate of solvent. At the discharge of the solvent pump, a side stream is taken to provide flush flows for the catalyst injection line (1 lb./hr (0.45 kg/hr)) and the reactor agitator (0.75 lb./hr (0.34 kg/ hr)). These flows are measured by differential pressure flow meters and controlled by manual adjustment of micro-flow needle valves. Uninhibited styrene monomer is supplied to the reactor at 30 psig (308 kPa). The feed to the reactor is measured by a mass flow meter. A variable speed diaphragm pump controls the feed rate. The styrene stream is mixed with the remaining solvent stream. Ethylene is supplied to the reactor at 600 psig (4,238 kPa). The ethylene stream is measured by a mass flow meter just prior to a valve controlling flow. A flow meter controller is used to deliver hydrogen into the ethylene stream at the outlet of the ethylene control valve. The ethylene/hydrogen mixture combines with the solvent/styrene stream at ambient temperature. The temperature of the solvent/monomer as it enters the reactor is reduced to about 5° C. by a heat exchanger with −5° C. glycol on the jacket thereof. This solvent/styrene stream enters the bottom of the reactor. The three component catalyst system described in Tables 1 and 2 and its solvent flush also enter the reactor at the bottom but through a different port than the monomer stream. Preparation of the catalyst components takes place in an inert atmosphere glove box. The diluted components are put in nitrogen padded cylinders and charged to catalyst run tanks for the reaction. From these run tanks the catalyst is pressured with piston pumps and the flow is measured with flow meters. These streams combine with each other and the catalyst flush solvent just prior to entry through a single injection line into the reactor where they react to form the designated polymers.

Polymerization is stopped as reaction mixture flowed into a reactor product line after the reactor, by addition of catalyst kill (water mixed with solvent) into the reactor product line after a flow meter which measures solution density. A static mixer in the line provides dispersion of the catalyst kill and additives in the reactor effluent stream. This effluent stream next entered post reactor heaters that provide additional energy for the solvent removal flash. This flash occurs as the effluent exits the post reactor heater and the pressure is dropped from 475 psig (3,275 kPa) down to ~250 mm Hg (33 kPa) of pressure absolute at the reactor pressure control valve. This flashed polymer enters a hot oil jacketed devolatilizer. Approximately 85 percent of the volatile compounds (hereinafter volatiles) are removed from the polymer in the devolatilizer. The volatiles exit the top of the devolatilizer. The stream of exiting volatiles are condensed with a glycol jacketed exchanger. The condensed volatiles enter the suction of a vacuum pump and are discharged to a glycol jacket solvent and styrene/ethylene separation vessel. Solvent and styrene are removed from the bottom of the vessel and ethylene from the top. The ethylene stream is measured with a flow meter and analyzed for composition. The measurement of vented ethylene plus a calculation of the dissolved gasses in the solvent/styrene stream are used to calculate the ethylene conversion. The polymer separated in the devolatilizer is pumped out with a gear pump to an extruder commercially available from Werner Pfleiderer Corporation under the trade designation ZSK-30 devolatilizing vacuum extruder. The dry polymer exits the extruder as a single strand. This strand is cooled as it is pulled through a water bath. The excess water is blown from the strand with air and the strand is chopped into pellets with a strand chopper.

TABLE 1

Catalyst and Co-Catalyst Employed

| Sample | Reactor Temp C. | Solvent | Ethylene flow lb./hr | Hydrogen flow SCCM | Styrene flow lb./hr | Ethylene Conversion % | Cocat Bor/Ti ratio | MMAO Al/Ti ratio | Catalyst Type |
|---|---|---|---|---|---|---|---|---|---|
| ESI58 | 85.6 | ethyl benzene | 2.3 | 8 | 8.5 | 90.1 | 1.24 | 6 | 1 |
| ESI73 | 61.5 | toluene | 1 | 8.9 | 20 | 83.9 | 1.25 | 10.1 | 2 |
| ESI41 | 91 | toluene | 3.13 | 16 | 5.4 | 95.6 | 2.99 | 7 | 2 |
| ESI51 | 90.1 | toluene | 2.06 | 9 | 4.6 | 96.4 | 3 | 7 | 2 |
| ESI69 | 79.4 | toluene | 2.18 | 6 | 16.5 | 94.9 | 3.49 | 9 | 2 |
| ESI72 | 78.4 | toluene | 2.17 | 3.5 | 21 | 96.4 | 3.5 | 6 | 2 |
| ESI31 | 97.2 | toluene | 4.35 | 40 | 5 | 96.1 | 3.49 | 3.5 | 2 |

SCCM means standard cubic centimeter

"Cocat Bor" refers to the boron containing co-catalysts which are bis-hydrogenated tallowalkyl methylammonium tetrakis (pentafluorophenyl)borate for ES58 and ES73 and tris(pentafluorophenyl)borane for the other ESI samples. Catalyst type I is (t-butylamido)dimethyl (tetramethylcyclopentadienyl)silane-titanium (II) 1,3-pentadiene. Catalyst type 2 is dimethyl [N-(1,1-dimethylethyl)-1,1-dimethyl-1-[(1,2,3,4,5-.eta.)-1,5,6,7-tetrahydro-3-phenyl-s-indacen-1-yl]silanaminato(2-)-N]-titanium MMAO: A modified methylaluminoxane commercially available from Akzo Nobel under the trade designation MMAO-3A was used.

OTHER REAGENTS

Vinyltrimethoxysilane [2 C.I. No.768-02-7] was purchased from Aldrich and used as received. Reported purity of 98% and molecular weight=148.2.

Dibutyltin dilaurate [C.I. No. 77-58-7] was purchased from Aldrich and used as received. Reported purity of 95%.

Dicumyl peroxide [C.I. No. 80-43-3] was purchased from Hercules Inc. under the tradename DI-CUP R Organic peroxide.

2-(4-azidosulfonylphenyl)-ethyltrimethoxysilane: A 500 ml flask equipped with a condenser, magnetic stirrer addition fuinel, and nitrogen inlet is charged with 100 ml of dry methanol and 5.76 g (88.6 mmol) of sodium azide. A solution of 5 g (14.8 mmol) of 2-(4-chlorosulfonylphenyl)-ethyltrichlorosilane (United Chemical Technologies Inc. CA registry number 79793-00-3) in 5 g of methylene chloride is added dropwise to the stirred reaction mixture at ambient temperature. A white precipitate forms upon addition of the sulfonyl chloride solution to the reaction mixture. The heterogeneous reaction mixture is stirred for 20 hours and is then filtered through a glass fritted funnel to remove the solid. TIhe filtrate is concentrated by rotary evaporation (bath–30° C.) to yield 8.7 g of a white solid (product+NaCl). The residue is slurried in methylene chloride and then filtered. The filtrate is concentrated by rotary evaporation (bath=30° C.) to yield 4.1 g of a colorless nonviscous oil. $^1$H NMR CDCI$_3$ δ7.9 (doublet, 2H), 7.4 (doublet, 2H), 3.6 (singlet, 9H), 2.8 triplet, 2H), 1.0 (triple,2H). $^{13}$C NMR CDCl$_3$δ152, 136, 130, 128, 50, 29, 11. IR cm$^{-1}$ 2950, 2850, 2140, 1600, 1380. Thermal analysis of the azidosilane by DSC reveal a decomposition peak centered at 201° C. (701.5 J/g). Proton (300 Mllz) and Carbon (75 MHz) nuclear magnetic resonance (NMR) spectra are run in deuterochloroform and referenced to tetramethylsilane (0 ppm). The NMR instrument is a Varian Inova. Infrared (IR) spectroscopy is performed on a Mattson Galaxy Series FTIR 5000. Differential Scanning Calorimetry (DSC) is performed on a DuPont DSC 2910 scanning at 10 C/min. The melting endotherms and decomposition exotherms are reported as the peak maxima.

COMPARATIVE EXAMPLES

The comparative examples (Table 2) are extruded on a Haake Polylab Polymer Processing unit equipped with a 18 mm twin screw extruder, a cooled water bath with air knife, and a pelletizer. Samples are prepared in a two step process. In the first step, silane is grafted onto the polymer using the following procedures: (a) the appropriate ratio solution of vinyltrimethoxy silane (VTMOS) and dicumyl peroxide is liquid injected into the extruder barrel along with the polymer, (b) the melt temperature and screw speed are 200 C and 50 rpm, respectively. In the second step, the dibutyltin dialurate catalyst is added to the VTMOS grafted polymer using the following procedure: (a) a 2% concentrate of the catalyst is made in each of the polymers studied by extruding the catalyst imbided copolymer pellet at melt temperature of 200 C and 50 rpm (b) the catalyst concentrate pellets are dry blended with silane-grafted material from step 1 and extruded at 200 C at 50 rpm. The samples are compression molded (190 C, 10,000 lb. of pressure, 3 minutes) into plaques immediately following preparation. The plaques are then cured by placing them in a tray of water which is heated in an oven to @ 60 C (water temperature) overnight. The plaques are then removed from the water and the upper service temperature of these samples is measured by TMA as well as the percent gel via xylene extraction. The results are shown in Table 5.

TABLE 2

Formulations for peroxide grafted vinyltrimethoxysilane (VTMOS)-comparative examples.

| Example[2] | ES41[1] | ES51[1] | ES69[1] | EG 8100[1] | VTMOS[1] (mole %) | Dicumyl Peroxide[1] | Dibutyltin Dilaurate[1] |
|---|---|---|---|---|---|---|---|
| C.E. A | 97.85 | 0 | 0 | 0 | 2 (0.0135) | 0.15 | 0.02 |
| C.E. B | 95.85 | 0 | 0 | 0 | 4 (0.027) | 0.15 | 0.02 |
| C.E. C | 0 | 0 | 97.85 | 0 | 2 (0.0135) | 0.15 | 0.02 |
| C.E. D | 0 | 0 | 95.85 | 0 | 4 (0.027) | 0.15 | 0.02 |
| C.E. E | 0 | 0 | 0 | 97.85 | 2 (0.0135) | 0.15 | 0.02 |
| C.E. F | 0 | 0 | 0 | 95.85 | 4 (0.027) | 0.15 | 0.02 |

[1]Numbers in the table refer to grams of reagent added unless otherwise noted.
[2]C.E. = Comparative Example Experimental Procedure (A): Preparation of 2-(4-Azidosulfonylphenyl)-Ethyltrimethoxysilane (Azidosilane) Crated Polyolefins.

To a Haake mixing bowl (small bowl (40.0 g)) heated to 140° C. and with the paddles turning at 75 RPM, 40.0 g of polymer (Table 3) is added. After 2 minutes, azidosilane is added to the mixing bowl via pipette. At a total time of three (t=3) minutes, the bowl temperature is ramped to 190° C. over a 1 minute period and the sample is mixed for 6 more minutes (t=10 minutes). One drop (about 0.02 g) of dibutyltin dilaurate is added to the bowl via pipette and the sample is mixed for 3 more minutes. The sample is removed from the mixing bowl and immediate compression molded into plaques (190° C., 10,000 lb. of pressure, 3 minutes). The samples are moisture-cured by placing the plaques in a tray of water which is heated in an oven to 60° C. (water temperature) overnight. The samples are removed from the water and the upper service temperature of these samples is measured by TMA. The percent gel via xylene extraction is also measured. The results are shown in Table 4.

TABLE 3

Azidosilane modified polyolefin samples

| Example | Polymer (40.0 g) | Grams of Azidosilane (mole %) |
|---|---|---|
| EX. 1 | EG 8100 | 0 |
| EX. 2 | EG 8100 | 0.4 (0.003) |
| EX. 3 | EG 8100 | 0.8 (0.006) |
| EX. 4 | SM 8400 | 0 |
| EX. 5 | SM 8400 | 0.4 (0.003) |
| EX. 6 | SM 8400 | 0.8 (0.006) |
| EX. 7 | SM 8400 | 1.2 (0.012) |
| EX. 8 | ES31 | 0.4 (0.003) |
| EX. 9 | ES73 | 0.4 (0.003) |
| EX. 10 | ES73 | 0.8 (0.006) |

Experimental Procedure (B): Preparation of 2-(4-Azidosulfonylphenyl)-Ethyltrimethoxysilane (Azidosilane) Grafted Polyolefins.

(Step 1) 40.0 g of polymer (Table 4) and azidosilane are premixed in a ZIPLOC™ bag. This sample is added to a small Brabender mixing bowl heated to 180° C. and stirred at 60 RPM. After 1 minute, the speed of the paddles is increased to 80 RPM and the sample is mixed for 4 more minutes. The sample is removed from the mixing bowl and cooled. (Step 2) The polymer from step 1 @ 37 grams) is blended with 3 weight percent of the concentrate @1 gram-1% dibutyltin dilaurate is ES72) in a Haake mixing bowl at 190° C. and 50 RPM for 10 minutes. The sample is removed from the mixing bowl and compression molded (190° C., 10,000 lb. of pressure, 3 minutes) into plaques immediately following preparation. The plaques are moisture-cured by placing them in a tray of water which is heated in an oven to 60° C. (water temperature) overnight. The plaques are removed from the water and the percent gel is measured by xylene extraction. The results are shown in Table 5.

TABLE 4

Azidosilane modified ESI samples

| Examples | Polymer (40 g) | grams of azidosilane (mole %) |
|---|---|---|
| EX. 11 | ES 72 | 0 |
| EX. 12 | ES 72 | 0.29 (0.0009) |
| EX. 13 | ES 72 | 0.56 (0.0017) |

TABLE 5

TMA and percent gel data

| Example/ Comparative Examples | Polymer | Reagent | mole % reagent | Percent Gel | UST (TMA) ° C. |
|---|---|---|---|---|---|
| C.E. E | EG 8100 | VTMOS | 0.0135 | 88 | 92 |
| C.E. F | EG 8100 | VTMOS | 0.027 | 94 | >185 |
| EX. 1 | EG 8100 | | 0 | 0 | 66 |
| EX. 2 | EG 8100 | Azidosilane | 0.003 | 61 | N.D. |
| EX. 3 | EG 8100 | Azidosilane | 0.006 | 89 | >185 |
| EX. 4 | SM 8400 | | 0 | 0 | 62 |
| EX. 4 | SM 8400 | Azidosilane | 0.003 | 62 | 65 |
| EX. 5 | SM 8400 | Azidosilane | 0.006 | 78 | 75 |
| EX. 6 | SM 8400 | Azidosilane | 0.012 | 82 | >185 |
| C.E. A | ES41 | VTMOS | 0.0135 | 46 | 55 |
| C.E. B | ES41 | VTMOS | 0.027 | 57 | 55 |
| EX. 8 | ES31 | Azidosilane | 0.003 | 45 | N.D. |
| C.E. C | ES69 | VTMOS | 0.0135 | 0 | 60 |
| C.E. D | ES69 | VTMOS | 0.027 | 0 | 60 |
| EX. 9 | ES73 | Azidosilane | 0.003 | 62 | 60 |
| EX. 10 | ES73 | Azidosilane | 0.006 | 75 | 64 |
| EX. 11 | ES72 | | 0 | 0 | N.D. |
| EX. 12 | ES72 | Azidosilane | 0.0009 | 64 | N.D. |
| EX. 13 | ES72 | Azidosilane | 0.0017 | 81 | N.D. |

The data indicate that the azidosilane reagents are much more effective (molar basis) for modifying polyolefin copolymers than peroxide grafting of vinyltrimethoxysilane. This difference in efficiency is especially acuste in the high styrene content ESI copolymers. Importantly, the silane-grafted polymers are still melt processable prior to moisture-curing.

We claim:

1. A water-curable silane-grafted polymer comprising the reaction product of:
   (A) a first polymer, the first polymer comprising an interpolymer comprising polymer units of at least one ethylene or α-olefin and at least one vinylidene aromatic compound; and
   (B) at least one monofunctional azidosilane
   wherein the interpolymer comprises:
   (a) from about 55 to about 95 mole percent of polymer units derived from at least one ethylene or α-olefin, and
   (b) from about 5 to about 45 mole percent of polymer units derived from at least one vinylidene aromatic interpolymer.

2. The silane-grafted polymer of claim 1, further comprising from greater than 0 to about 15 weight percent of polymer units derived from at least one diene.

3. The silane-grafted polymer of claim 1, wherein the α-olefin is selected from the group consisting of propylene, 1-butene, 3-methyl-1-butene, 1-pentene, 4-hexene, 5-methyl-1-hexene, 4-ethyl-1-hexene, 1-octene, 1-dodecene, 3-phenylpropene, and mixtures thereof.

4. The silane-grafted polymer of claim 1, wherein the vinylidene aromatic compound is selected from the groups consisting of styrene, chlorostyrene, vinylbenzocyclobutane, and mixtures thereof.

5. The silane-grafted polymer of claim 2, wherein the diene is selected from the group consisting of butadiene, 1,3-pentadiene, 1,4-pentadiene, isoprene, 1,4-hexadiene, 7-methyl-1,6-octadiene, dicyclopentadiene, methylenenorbornene, ethylidenenorbornene, methyltetrahydroindene, α-methylstyrene divinylbenzene, and mixtures thereof.

6. An azidosilane grafted polymer of formula (I):

$$M_a(NH\text{-}G\text{-}R\text{-}SiZ_3)_b,\quad\text{(I)}$$

where:
   (A) M is a polymer repeating unit in a polymer, the polymer comprising interpolymers of at least one ethylene or α-olefin and at least one vinylidene aromatic compound;
   (B) a is the number of polymer repeating units in the polymer chain;

(C) G is selected from the group consisting of a sulfonyl group and a carbonyl group;

(D) R is selected from the group consisting of hydrocarbon radicals, halo-substituted hydrocarbon radicals, hydrocarbon-oxyhydrocarbon radicals, hydrocarbon-thiocarbon radicals, and hydrosulfonyl-hydrocarbon radicals;

(E) Z is, independently each occurrence, a hydrogen, an organic radical, another hydrolyzable group, or a halogen; and, (F) b is the number of azidosilane molecules grafted onto the polymer chain, b is greater than 0 and is less than a.

7. A water-curable silane-grafted polymer comprising the reaction product of:

(A) a first polymer, the first polymer comprising an interpolymer comprising polymer units of at least one ethylene or $\alpha$-olefin and at least one vinylidene aromatic compound; and (B) at least one monofunctional azidosilane.

8. A process for making a water-curable silane-grafted polymer, the process comprising the steps of:

(A) admixing (i) a first polymer, the first polymer comprising an interpolymer, the interpolymer comprising polymer units of at least one ethylene or $\alpha$-olefin and at least one vinylidene aromatic compound; and (ii) at least one monofunctional azidosilane, the azidosilane having a decomposition temperature, and (B) heating the mixture of (A) to a temperature at least the decomposition temperature of the azidosilane.

* * * * *